Patented Mar. 5, 1946

2,395,989

UNITED STATES PATENT OFFICE 2,395,989

QUATERNARY AMMONIUM NITROPHENATES

Louis H. Bock, Huntingdon Valley, and Alva L. Houk, Philadelphia, Pa., assignors to Röhm & Haas Company, Philadelphia, Pa., a corporation of Delaware No Drawing. Application September 11, 1943, Serial No. 502,050

6 Claims. (Cl. 260—583)

This invention relates to new capillary-active quaternary ammonium compounds.

It has already been found that various quaternary ammonium salts provide bactericidal action and that some of these compounds have fungicidal value. When such compounds are applied to fibrous materials, however, for the purpose of preventing mildew, most of the compounds known heretofore either fail to be sufficiently potent to protect against mildew or to prevent rotting or tendering of the fibers, yarns, or fabrics treated therewith over a period of time. In cases where the compound is sufficiently soluble to permit effective application and to show high efficiency in tests in vitro, it frequently happens that the compound is readily leached from fabrics in actual use, and the fabrics are not effectively protected thereby under all conditions.

We have now found new quaternary ammonium compounds which have the properties requisite for their use in efficient mildew-proofing compositions and also the property of being well retained by fibers, yarns, and fabrics, resisting leaching and maintaining their protective action indefinitely. These quaternary ammonium compounds are of the formula:

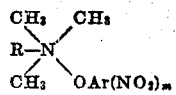

wherein R is a lyophilic group selected from aliphatic hydrocarbon and araliphatic groups having at least eight carbon atoms, $m$ is an integer from one to three, inclusive, and Ar is an aryl group of the benzene and naphthalene series. R may be a group such as octyl, capryl, decyl, undecenyl, dodecyl, cetyl, octadecyl, octadecenyl, or in general any straight or branched, saturated or unsaturated aliphatic hydrocarbon or an araliphatic group such as isopropyl benzyl, butyl benzyl, phenyl propyl, methyl phenyl propyl, methyl phenoxyethyl, tert.-butylphenoxyethyl, phenoxyethoxyethyl, diisobutylphenoxyethoxyethyl, octylphenoxyethoxyethoxyethyl, decylphenoxy propyl, etc.

Compounds of the above formula are prepared by reacting by heating together a methoxy nitrobenzene or naphthalene and a tertiary amine, $RN(CH_3)_2$, having two methyl substituents and a third substituent selected from long-chained aliphatic and arylaliphatic groups, having a group R, such as shown above. Typical of these amines are dodecyldimethylamine, octyldimethylamine, octadecyldimethylamine, octadecenyldimethylamine, phenoxyethoxyethoxyethyldimethylamine, or tert.-butylbenzyldimethylamine. Typical methoxynitroaryl compounds are dinitroanisole, trinitroanisole, chloronitroanisole, bromodinitroanisole, methoxydinitronaphthalene, methoxychloronitronaphthalene, etc. The benzene or naphthalene ring may be substituted in addition to one or more nitro groups with one or more such groups as chloro, bromo, alkyl, including methyl, proply, butyl, iso-octyl, octyl, dodecyl, etc., aryl, including acetyl, propionyl, valeryl, etc., or other neutral substituent.

The tertiary amine and methoxynitroaryl compound may be reacted by mixing and heating at 100° C. to 200° C. with or without a solvent. The quaternary compound formed in this way may be purified by crystallization, by stripping off a volatile component, or by other suitable procedure. The final products are, without exception, colored. They are readily absorbed from their solutions by textile fibers, particularly cellulosic fibers, and tenaciously retained thereby. Fibers so treated resist attack by fungi and bacteria and retain their strength even though buried in damp earth. Hence, the compounds of this invention are useful for protecting sandbags against decay. For such purposes, impregnating compositions containing a ¼% or more of these compounds may be used.

The preparation of typical quaternary compounds of the above type is illustrated in the following examples. The parts given are by weight.

Example 1

A mixture of 12 parts of 2,6-dinitro-4-chloroanisole and 17.3 parts of octadecylmethylamine was heated, with stirring, for two hours at 140° C. When cooled, the material formed shiny orange crystals which were washed in naphtha and dried. The yield was 16 parts. The product was soluble in water to give a clear, soapy solution. It melted at 89°–91° C.

Example 2

A mixture of 10 parts of methyl picrate and 14 parts of octadecyldimethylamine was heated slowly to 150° C. and allowed to cool. Crystallization from benzene gave 23.5 parts of shiny gold-colored crystals with a melting point of 120°–126° C. The product was sparingly soluble in hot water.

Example 3

A mixture of 100 parts of octadecyldimethylamine and 60 parts of 2,4-dinitroanisole was stirred for two hours at 140° C. Forty parts of the crude product was removed and solidified to a shiny crystalline mass. The remainder was crystallized from a benzene-naphtha mixture to give very fine, shiny crystals which were filtered on a fluted paper and dried in a vacuum disiccator. The yield of crystallized product was 81 parts. It dissolved in water to give a yellow, soapy, and somewhat gelatinous solution. The crystals melted at 70°–73° C.

Example 4

A mixture of 14 parts of 1-nitro-2-methoxynaphthalene and 23 parts of octadecyldimethylamine was stirred at 160° C. for five hours. The product crystallized from methyl ethyl ketone in lustrous coppery crystals which were soluble in warm water to give a clear, soapy solution. The crystals melted at 163°–165° C.

Example 5

A solution of 34 parts of p-(1,1,3,3-tetramethylbutyl) phenoxyethoxyethyldimethylamine and 20 parts of dinitroanisole in 70 parts of nitrobenzene was heated for five hours at 140° C. Water was added and the mixture steam-distilled as long as oil was removed. The aqueous layer was separated, amounting to 140 parts. It contained 9.36% solids and 0.69% of nitrogen (theoretical percentage of nitrogen is 0.76).

Example 6

A mixture of 54 parts of dodecyldimethylamine and 49.5 parts of 2,4-dinitroanisole was stirred at 140° C. for nine hours. The product was soluble in water to give an orange-colored, soapy solution.

The dodecyldimethylamine may be replaced with 40 parts of octyldimethylamine to form the corresponding octyltrimethyl quaternary ammonium dinitrophenate, which gives deep yellow to orange solutions exhibiting capillary activity.

Example 7

A mixture of 19.8 parts of dinitroanisole and 20 parts of butylbenzyldimethylamine was heated and stirred for two hours at 140° C. The resulting mixture was poured into water and steam-distilled to remove unreacted material. A clear red solution resulted.

The preferred compounds are those made from phenates having two or three nitro substituents and twelve to eighteen carbon atoms in an aliphatic hydrocarbon chain attached to the nitrogen atom.

Individual compounds were dissolved in water or water and an organic solvent, such as acetone or isopropanol, and the resulting composition used for impregnating cotton cloth (Osnaburg). Pieces of the cloth were then tested according to the procedure described in Tentative Specifications of the Corps of Engineers, United States Army, T-1452, as amended June 10, 1941, and January 12, 1942, with the substitution of Metarrhizium for the Chaetomium of the said specification, since it had been found that the former organism was more severe in its attack. Samples of impregnated fabric containing about 1% of the quaternary ammonium compound were leached for twenty-four hours with running water and then tested. No growth took place in any case before leaching. After leaching, there was still no growth on all except one test specimen, that impregnated with diisobutylphenoxyethoxyethyl trimethyl ammonium phenate. In this case, there was a slight growth after leaching. There was no loss of tensile strength, however, in the case of this specimen or any other.

A dextrose-agar plate was prepared, and thereover was flooded a 1% solution of octadecyl trimethyl ammonium 2,4-dinitrophenate. This solution was left in contact with the plate for two days and then poured off. The plate was then inoculated with a culture of *Aspergillus niger*. The inoculated plate was incubated at 88°–92° F. for seven days. No growth occurred. It is evident, therefore, that the nitrophenates of this invention are fungicidal against those fungi, such as Aspergillus or Penicillium, which normally attack nitrogenous materials, including silk, wool, and leather.

The compounds of this invention may be used as the sole treating agent or they may be used in conjunction with textile finishing agents, sizes, and the like, which are compatible with cationactive compounds. They may be used, for example, in compositions which also comprise copper or mercury compounds.

The compounds of this invention are useful for rot-proofing dyed or undyed fibrous cellulosic materials. These include not only cotton, as mentioned above, but also jute, ramie, linen, rayon, sisal, paper, wood fiber, and the like, or mixtures containing such fibrous cellulosic materials. The compounds are also useful in protecting dyed or undyed nitrogenous materials. The fibrous materials may be in the form of fibers, yarns, twines, woven fabrics, knitted fabrics, felted fabrics, pulp, paper board, fiber board, etc. The compounds of this invention may also be used for rot-proofing fabric which is coated with rubber, synthetic resinous compositions, or other coating materials.

We claim:

1. As a new compound, a quaternary ammonium salt of the formula:

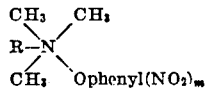

wherein R is an aliphatic hydrocarbon group of 12 to 18 carbon atoms and $m$ is an integer having a value from two to three, inclusive.

2. As a new compound, a quaternary ammonium salt of the formula:

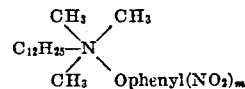

wherein $m$ is an integer having a value from two to three, inclusive.

3. As a new compound, a quaternary ammonium salt of the formula:

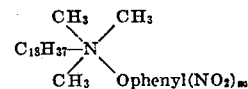

wherein $m$ is an integer having a value from two to three, inclusive.

4. As a new compound, a quaternary ammonium salt of the formula:

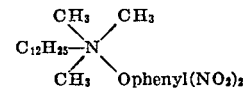

5. As a new compound, a quaternary ammonium salt of the formula:

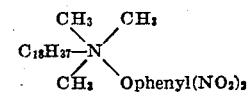

6. As a new compound, a quaternary ammonium salt of the formula:

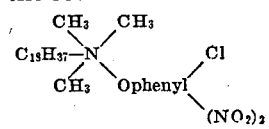

LOUIS H. BOCK.
ALVA L. HOUK.